(12) United States Patent
Müller

(10) Patent No.: US 6,733,033 B2
(45) Date of Patent: May 11, 2004

(54) AIRBAG DEVICE AND METHOD FOR OPERATING AN AIRBAG DEVICE

(75) Inventor: Olaf Müller, Rüsselsheim (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/281,829

(22) Filed: Oct. 28, 2002

(65) Prior Publication Data

US 2003/0071443 A1 Apr. 17, 2003

Related U.S. Application Data

(63) Continuation of application No. PCT/DE01/01594, filed on Apr. 27, 2001.

(30) Foreign Application Priority Data

Apr. 27, 2000 (DE) .................................... 200 07 632 U

(51) Int. Cl.⁷ .............................................. B60R 21/20
(52) U.S. Cl. .................................. 280/728.3; 280/732
(58) Field of Search ............................ 280/728.3, 732, 280/728.2, 731

(56) References Cited

U.S. PATENT DOCUMENTS

| | | | |
|---|---|---|---|
| 5,292,151 A | * 3/1994 | Parker .................... | 280/728.3 |
| 5,344,184 A | 9/1994 | Keeler et al. | |
| 5,360,231 A | 11/1994 | Adams | |
| 5,476,283 A | * 12/1995 | Elton ...................... | 280/753 |
| 5,899,488 A | 5/1999 | Müller | |
| 6,045,153 A | * 4/2000 | Sommer et al. ........ | 280/728.3 |
| 6,158,763 A | * 12/2000 | Dominique et al. .... | 280/728.2 |
| 6,161,864 A | * 12/2000 | Heilig ..................... | 280/728.2 |
| 6,203,056 B1 | * 3/2001 | Labrie et al. ........... | 280/728.3 |
| 6,315,321 B1 | * 11/2001 | Lutz ....................... | 280/728.3 |
| 6,349,963 B1 | * 2/2002 | Muller .................... | 280/728.3 |

FOREIGN PATENT DOCUMENTS

| | | |
|---|---|---|
| DE | 44 45 737 A1 | 6/1995 |
| DE | 197 57 437 A1 | 7/1998 |
| DE | 197 26 878 A1 | 10/1998 |
| DE | 197 33 896 A1 | 2/1999 |
| DE | 198 46 992 A1 | 4/1999 |
| DE | 198 44 412 A1 | 7/1999 |
| EP | 0 867 346 A1 | 9/1998 |
| WO | WO 99/58389 | 11/1999 |
| WO | WO 99/61288 | 12/1999 |

* cited by examiner

Primary Examiner—David R. Dunn
(74) Attorney, Agent, or Firm—Laurence A. Greenberg; Werner H. Stemer; Manfred Beck

(57) ABSTRACT

An airbag device includes an airbag module that is located behind a multipart dashboard. An opening device opens the multipart dashboard in a manner similar to that of the mouth of a fish. An operating method for an airbag device with an airbag module located behind a multipart dashboard includes opening the dashboard in a manner similar to that of the mouth of a fish before, during, or after the triggering of the airbag device. According to another embodiment, a dashboard includes at least one fabric flap or foil flap which is integrated into the dashboard on at least one side by using detachable retaining devices in order to close an opening in the dashboard. The airbag module is positioned behind the opening in such a way that an airbag opens the retaining devices when it is triggered and emerges through the opening.

17 Claims, 3 Drawing Sheets

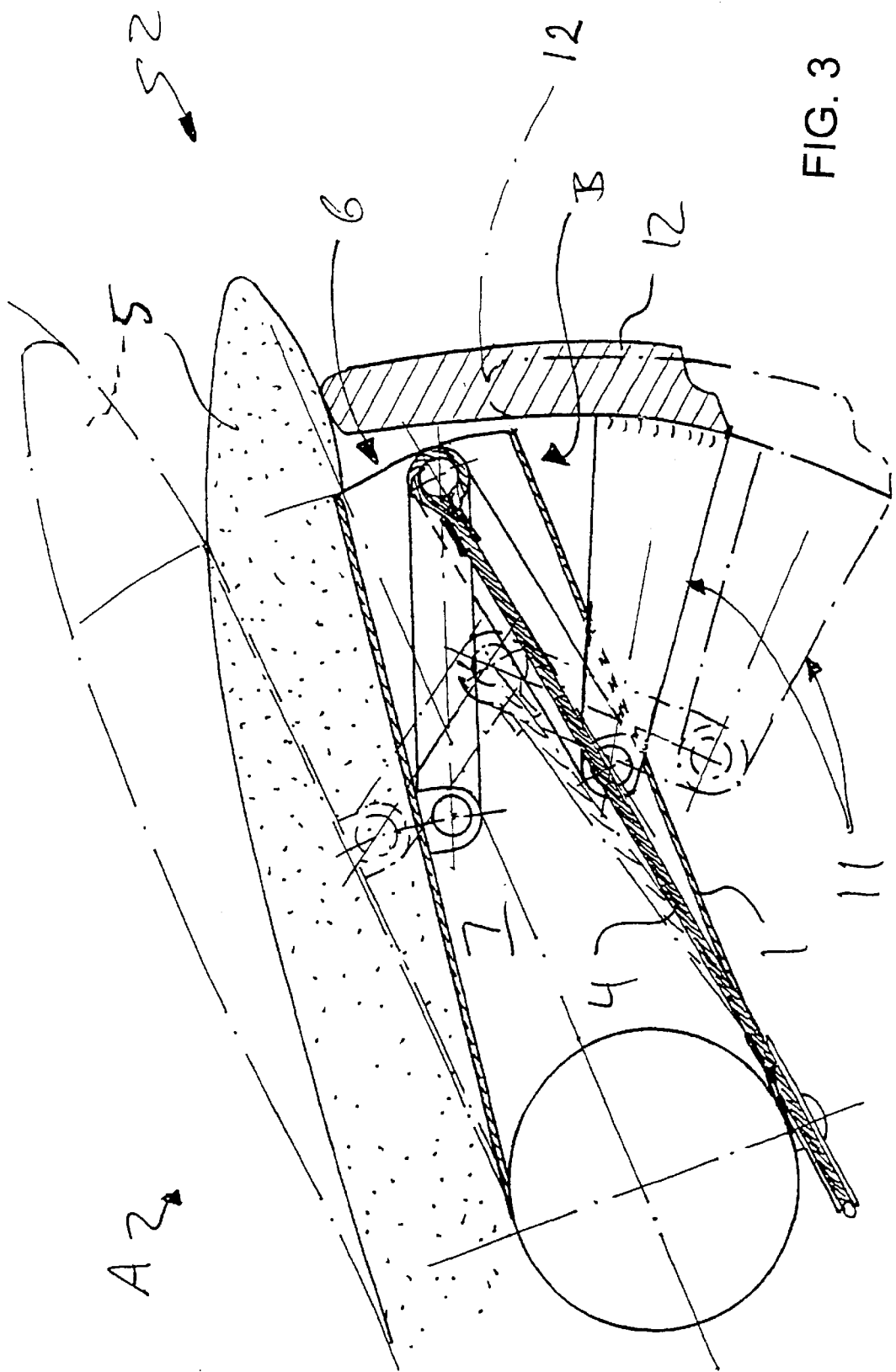

AIRBAG DEVICE AND METHOD FOR OPERATING AN AIRBAG DEVICE

CROSS-REFERENCE TO RELATED APPLICATIONS

This application is a continuation of copending International Application No. PCT/DE01/01594, filed Apr. 27, 2001, which designated the United States and was not published in English.

BACKGROUND OF THE INVENTION

Field of the Invention

The invention relates in general to airbag devices and to methods for operating airbag devices. The invention relates in particular to an airbag device having an airbag module, a cover, and an opening mechanism for the latter. The cover is opened before an airbag of the airbag module emerges toward an occupant of a vehicle.

Conventional airbag devices and triggering methods for airbag devices are disclosed in Published, Non-Prosecuted German Patent Application Nos. DE 197 26 878 A1 and DE 197 33 896 A1, European Patent Application No. EP 0 867 346 A1, and International Publication No. WO 99/61288 by the applicant and/or assignee of the instant application. The present invention relates to improvements in all of the embodiments and techniques dealt with in the earlier applications, in particular with regard to the construction of the airbag device and the triggering control and, especially, to a configuration for controlling an airbag flap.

Conventional airbags use so much energy for opening the airbag flaps such that, when these airbags emerge, they may have an undesirable "aggressiveness" toward passengers who are not buckled up or passengers who have their head on or close to the airbag exit point. In order to solve this problem, the above-mentioned patent applications provide mechanisms and methods which are used prior to the emergence of an airbag, which is accommodated together with its airbag module behind a trim panel of a vehicle, such that this trim panel or cover is actively opened. The airbag itself thus no longer has to produce the opening in the trim panel or cover and also does not need to provide the required energy by initially providing an appropriately high gas pressure in the airbag so that it can push open the cover. Rather, the airbag can unfold freely through the opening which is already present.

SUMMARY OF THE INVENTION

It is accordingly an object of the invention to provide an airbag device and a method for operating an airbag device, especially for two-part covers or multipart dashboards of an airbag device, which overcome the above-mentioned disadvantages of the heretofore-known airbag devices and methods for operating airbag devices of this general type and which provide an outlet opening for the airbag in a rapid and simple manner, in order to reduce an undesirable aggressiveness of the airbag when being triggering.

With the foregoing and other objects in view there is provided, in accordance with the invention, an airbag device, including:

a multipart dashboard;

an airbag module disposed behind the multipart dashboard; and an opening device operatively connected to the multipart dashboard, the opening device being configured to open the multipart dashboard substantially when the airbag module is triggered, and the multipart dashboard being configured to open in a manner of a fish's mouth.

In particular, the present invention can be used as a supplement to the various devices and methods described in the patent applications mentioned above, and can furthermore contribute to reducing the aggressiveness of the airbag by producing an opening for the emergence of an airbag in a dashboard in a non-hazardous manner.

The invention relates in particular to mechanisms or configurations and their operating methods which, especially in the case of multipart dashboards, bend up their upper part and/or their lower part in such a manner that an opening in the manner of a fish's mouth is produced. To this end, use is made of a special airbag module mechanism or airbag device mechanism and a corresponding method for opening a two-part dashboard before emergence of an airbag.

According to the invention, this "bending open" is undertaken preferably not by the airbag, but by a mechanism which receives its pyrotechnic driving energy from a generator.

The generator may be an additional generator which drives a piston in a cylinder. Cables, levers or straps may be attached to the piston and actuate a mechanism which opens an appropriately divided dashboard in the manner of a fish's mouth.

The airbag generator for producing gas for inflating the airbag preferably also provides the energy for opening the dashboard. In particular, for driving purposes a cup-like container or piston is fitted over the generator and is supplied with gas pressure by the latter after triggering has taken place, with the result that the container or piston moves linearly or in a screw-like manner.

Cables, levers or straps connected to the container or piston preferably open the "fish's mouth" before the piston releases a gas flow into the airbag.

According to one aspect, the invention provides an airbag device having an airbag module behind a multipart dashboard, an opening device or opening devices being provided in order to open the dashboard in the manner of a fish's mouth before, during or after triggering of the airbag device. In the process, the multipart nature of the dashboard is used in an advantageous manner in order to provide a simple, rapid and reliable manner of opening an outlet opening for an airbag without the airbag itself having to provide the force in order to open the opening and, as a result, penetrating with a corresponding momentum forward toward an occupant.

The dashboard preferably contains at least one dashboard upper part or a dashboard lower part, and the opening devices contain a piston which can be acted upon and adjusted at least with the dashboard upper part or the dashboard lower part in order to open the part. The piston may furthermore be guided on a cylinder-like airbag module, the piston preferably being guided on the airbag module in a manner resulting in a screw-like linear and rotational movement, i.e. the piston performs a substantially helical movement. As an alternative or in addition, the piston can be connected to at least one dashboard upper part or a dashboard lower part through the use of pulling devices, in particular cables, and/or a mechanism.

According to another feature of the invention, the dashboard includes at least one dashboard upper part and/or a dashboard lower part, which part/parts can be adjusted and/or deformed through the use of the opening device or opening devices in order to form an opening for the emergence of an airbag.

With the objects of the invention in view there is also provided, an airbag device, including:

a dashboard having an opening formed therein, the dashboard including an airbag flap for covering the opening in the dashboard, the airbag flap being selected from the group consisting of a fabric flap and a foil flap;

releasable retaining devices for closing the opening in the dashboard, the airbag flap being integrated, at least at one side thereof, in the dashboard via the releasable retaining devices; and an airbag module including an airbag, the airbag module being disposed behind the opening in the dashboard such that, when the airbag module is triggered, the airbag opens the releasable retaining devices and the airbag emerges through the opening in the dashboard.

In other words, in the case of an airbag device having an airbag module behind a dashboard, provision is made according to a second aspect of the present invention for the dashboard to contain at least one fabric-like or foil-like airbag flap which is integrated in the dashboard at least on one side through the use of releasable retaining devices in order to close an opening in the dashboard, and for the airbag module to be disposed behind the opening in such a manner that an airbag of the airbag module, after being triggered, opens the retaining devices and emerges through the opening.

According to another feature of the invention, the releasable retaining devices for closing an opening in the dashboard are touch-and-close tape devices such as VELCRO fasteners.

With the objects of the invention in view there is also provided, a method for operating an airbag device, the method includes the steps of:

providing an airbag module behind a multipart dashboard;

triggering the airbag module; opening the multipart dashboard in a manner of a fish's mouth prior to, during or after the triggering the airbag module.

In other words, in the case of an operating method for an airbag device having an airbag module behind a multipart dashboard in accordance with one aspect of the invention, the dashboard can be opened in the manner of a fish's mouth before, during or after triggering the airbag device.

According to another mode of the invention, at least one dashboard upper part and/or a dashboard lower part is adjusted and/or deformed in order to provide an opening in the dashboard for the emergence of an airbag. As an alternative or in addition, provision may be made for the opening of the dashboard to be brought about by a piston, the piston preferably being operated by a gas generator of the airbag module, and this gas generator furthermore preferably also being used for producing the gas for filling the airbag. The latter mode of the invention can be refined even further by the filling of the airbag with gas from the gas generator of the airbag module being controlled by the position of the piston.

Furthermore, it is possible and advantageous in the case of the above-mentioned variants of the operating method, if the piston executes a screw-like linear and rotational movement for producing the opening in the dashboard and is coupled to the dashboard via pulling devices, in particular cables.

With the objects of the invention in view there is also provided, a method for operating an airbag device, the method includes the steps of:

providing a dashboard with an airbag flap such as a fabric flap or a foil flap;

providing the airbag flap with releasable retaining devices for closing an opening in the dashboard; and opening the releasable retaining devices at least on one side of the airbag flap by filling gas into an airbag such that the airbag pushes through the opening in the dashboard.

In other words, according to the second aspect of the present invention, an operating method for an airbag device having an airbag module behind a dashboard is provided in such a manner that retaining devices, which can be released at least on one side, of a fabric-like or foil-like airbag flap for closing an opening in the dashboard are opened by an airbag pushing through the opening as it is being filled with gas. Provision may furthermore be made in addition for the retaining devices, which can be released at least on one side, to be touch-and-close tape devices.

Other features which are considered as characteristic for the invention are set forth in the appended claims.

Although the invention is illustrated and described herein as embodied in airbag devices and operating methods for airbag devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic, partial sectional view of a third exemplary embodiment of an airbag device according to the invention.

DESCRIPTION OF THE PREFERRED EMBODIMENTS

Figure 1:
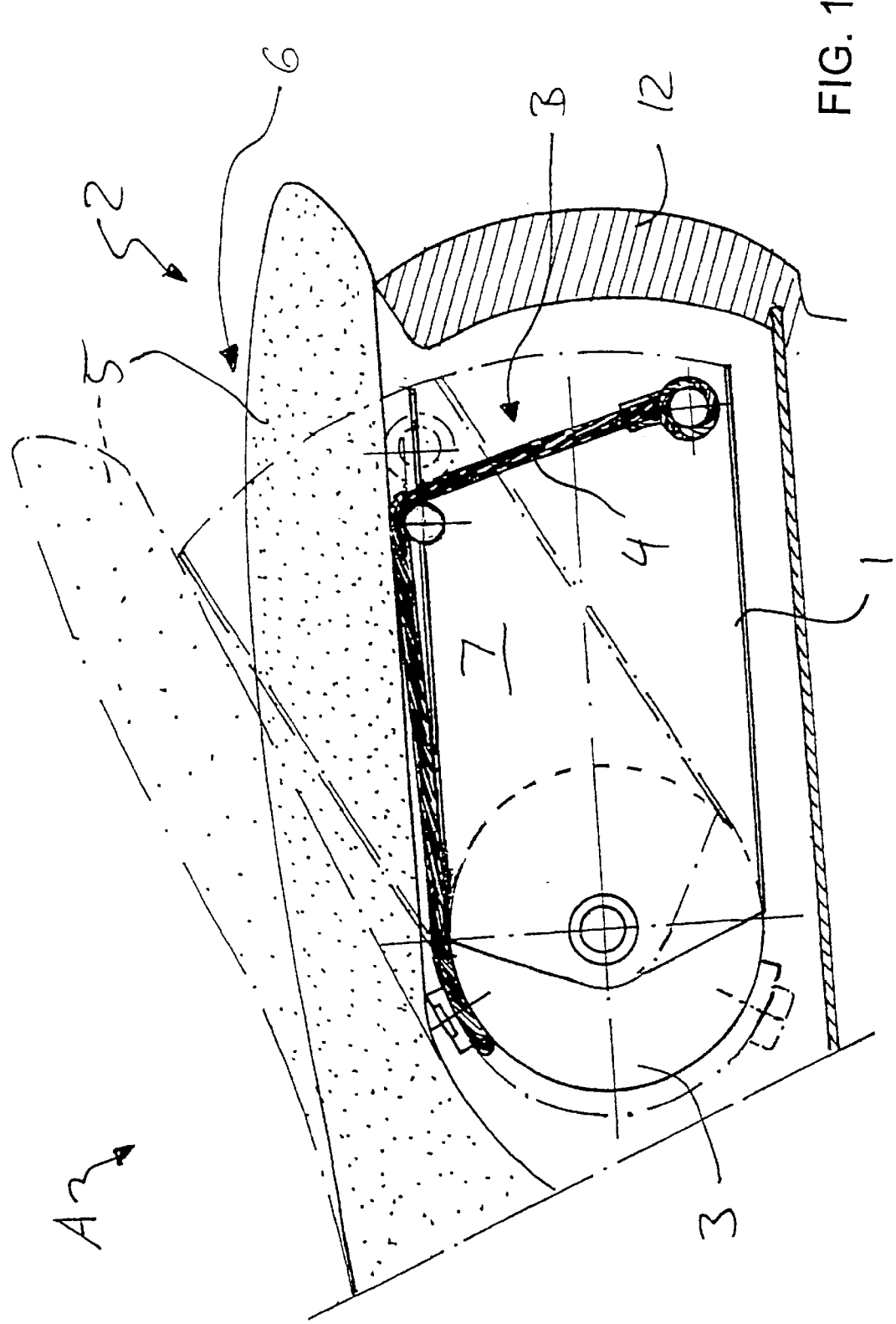
FIG. 1 is a diagrammatic, partial sectional view of a first exemplary embodiment of an airbag device according to the invention.

The same reference numbers in the individual figures of the drawings denote identical or similar components or identically or similarly acting components. The illustrations in the drawings clarify even those features which are not provided with reference numerals irrespective of whether these features are described below. On the other hand, features which are explained in the description of the preferred embodiments, but are not illustrated in the drawings, are also readily comprehensible to a person of skill in the art. The disclosure of the above-mentioned applications, in particular with regard to the construction of the airbag device and the triggering control and, especially, with regard to a configuration for controlling an airbag flap, is hereby incorporated by reference.

Referring now to the figures of the drawings in detail and first, particularly, to FIG. 1 thereof, there is shown a section through an airbag device A having an airbag module 1 which is arranged in a multipart dashboard 2. In this case, a piston 3 is shown which, after triggering of the airbag module 1, moves in a screw-like, i.e. helical, manner axially along the cylindrical airbag module 1. The piston 3 is positioned in a cup-like manner over the cylindrical airbag module 1 and cables or in more general terms pulling devices 4 are connected to the piston 3. When the airbag module 1 is triggered, gas, which is preferably supplied from a pyrotechnic gas generator of the airbag module 1, is initially conducted into the piston 3, with the result that gas pressure acts on the piston 3. The piston 3 then moves by rotating like a screw linearly along the cylindrical airbag module 1. In the process, on the one hand, the cables 4 are wound onto the piston 3 and, on the other hand, the cables are deflected or routed in such a manner that the cables pivot the airbag module 1, and therefore push up a dashboard upper part 5 of the multipart dashboard 2 in such a manner that an airbag opening 6 is formed, which is straight at the bottom and "curved" at the top. The final position of the airbag module 1 is shown by dot-dash lines.

In this exemplary embodiment, the airbag module 1 together with the piston 3 and the cables 4 form opening devices B. The gas generator for driving the piston 3 may be the gas generator which produces the gas for inflating the airbag or may be a separate gas generator. Other driving devices may also be used for actuating the piston 3. Furthermore, the invention is not restricted to guiding the piston in a screw-like manner in order to produce a winding-up of the cables 4. The piston 3 may also only be guided linearly, in which case correspondingly suitable devices are then to be used to transmit the force and movement to at least one part of the multipart dashboard 2, in order to be able to provide the opening 6.

Figure 2:
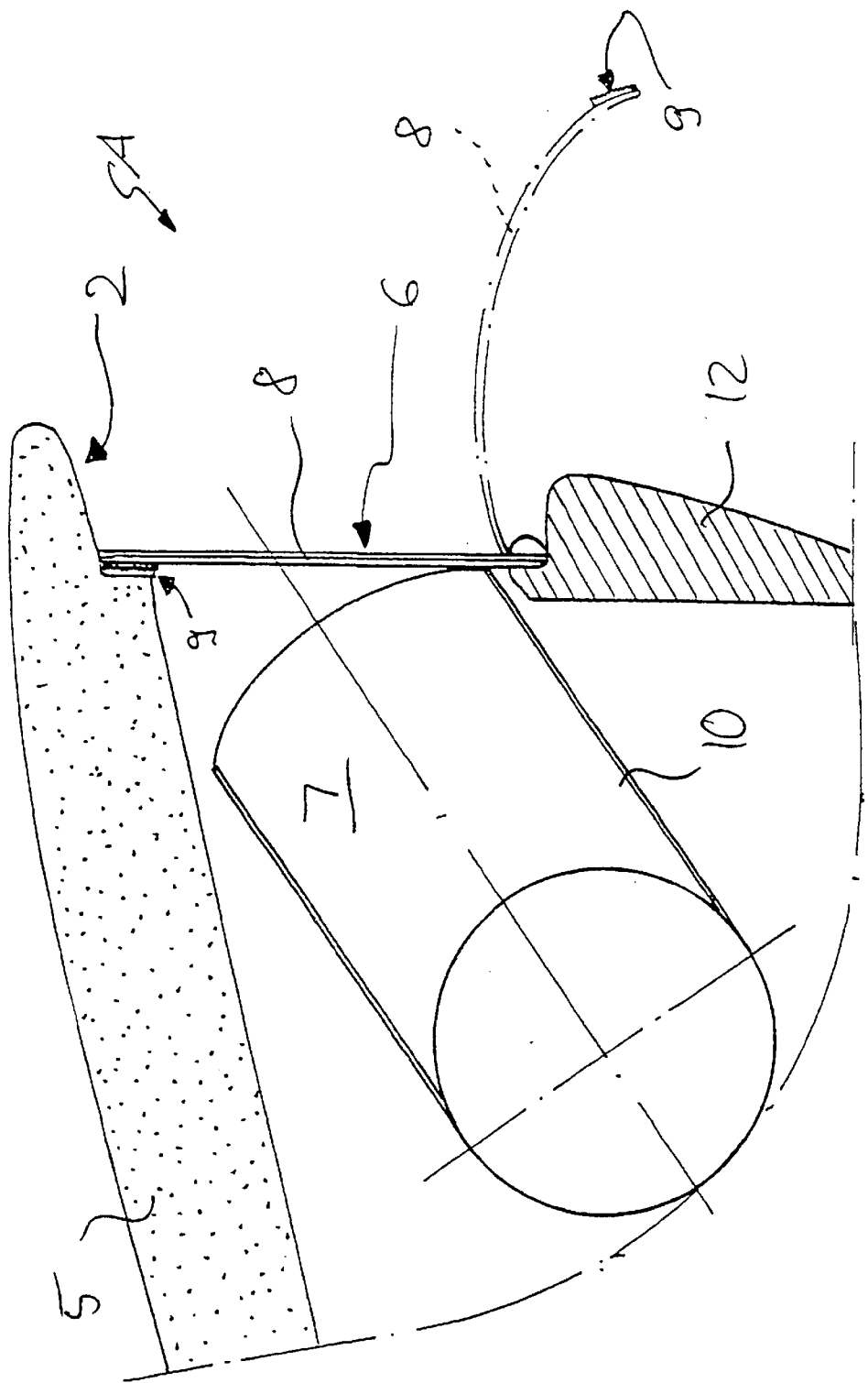
FIG. 2 is a diagrammatic, partial sectional view of a second exemplary embodiment of an airbag device according to the invention.

FIG. 2 shows an alternative of a non-aggressive airbag 7 of an airbag module 1, which airbag is indicated only in a schematic manner in its folded up state. In the case of this exemplary embodiment, an airbag flap 8 is produced as part of the multipart dashboard 2 from a fabric cover which tears open at least on one side without requiring great force and is fastened, for example, only by a touch-and-close tape device, for example a VELCRO tape, or in general by retaining devices 9. The airbag module 10 then does not need any mechanism for this purpose.

FIG. 3 shows a third exemplary embodiment of an airbag device A. This airbag device A is basically constructed in the same manner as the airbag device shown in FIG. 1 and described in conjunction therewith. Therefore, in the following text, features and functions will only be described insofar as they go beyond the details relating to FIG. 1, and reference will be made in this respect to the illustration of FIG. 1 and to the description of FIG. 1 in order to avoid repetitions. The airbag device A according to FIG. 3 contains a mechanism or, in particular, a lever mechanism 11 which, when the cables 4 are activated via, for example, a piston 3, pushes the dashboard upper part 5 and a dashboard lower part 12 apart in such a manner that an airbag opening 6 in the manner of a "fish's mouth" is produced. For this purpose, apart from being connected at one end to the piston 3, the cables 4 are connected at the other end to the lever mechanism 11. This lever mechanism 11 is configured in a scissor-type manner and, when pulled by the cables 4, produces an expanding effect between the dashboard upper part 5 and the dashboard lower part 12, so that the opening 6 is produced.

It is also possible, for example in the case of the exemplary embodiment according to FIG. 1, to bring about the adjustment of the airbag module by using other mechanisms for bending up at least one part of the multipart dashboard or putting it in a more upright position, or generally open at least one part of the multipart dashboard. For example, the adjustment can be carried out with a separate adjusting cylinder which in particular is acted upon pyrotechnically. One or more cylinders of this type may, however, also be used to directly adjust or push up or bend up at least one part of the multipart dashboard. If, which is particularly advantageous, the gas generator, which is present in any case for inflating the airbag, is used for the drive for opening at least one part of the multipart dashboard, it can be used to operate a piston which is used for adjusting or pushing up or bending up the at least one part of the multipart dashboard. For this purpose, the piston can act on the at least one part of the multipart dashboard directly or via any suitable mechanism and/or by deflecting the direction of movement. At the same time, the piston may, when it is on its actuating path, for example after covering a predetermined adjustment distance, release lines via which gas is conducted from the gas generator into the airbag.

Furthermore, the present invention is not restricted to the airbag device being combined with a dashboard or containing a dashboard. Rather, instead of the dashboard any other cover or trim panel can be used. According to the invention, the only essential thing is generating a suitable opening in the cover or trim panel through which opening the airbag can emerge without the airbag itself having to apply the force for opening the opening, or only a very small force having to be applied by the airbag in order to open the opening, such as, for example, in the case of the airbag flap in the form of a fabric or foil cover of the opening having a touch-and-close securing device.

Exemplary operating methods for the individual exemplary embodiments of the airbag device A emerge from the description of FIGS. 1 to 3.

In summary, the invention in particular provides a mechanism which is driven by pyrotechnics and which opens a part of a multipart dashboard and thereby forming an airbag outlet opening in the manner of a fish's mouth, without direct assistance of an airbag. According to one alternative, the cover is made from textile or a foil-like material or the like, which is also fastened in such a manner that it is easy to open. The various embodiments of the invention provide possibilities for reducing the aggressiveness of the airbag.

The features and combinations of features of the exemplary embodiments described above and in the drawings serve merely to clarify the invention by way of example and not to restrict it. The disclosure of the present document is determined by what a person of skill in the art can readily gather from the claims, the description, the drawings and the entire contents of Published, Non-Prosecuted German Patent Application No. DE 198 44 412 A1, International Publication No. WO 99/58389, and the above-mentioned applications. In particular, the invention furthermore includes all of the variations, combinations, modifications and substitutions which can be gathered by a skilled person from the entire disclosure of the present application. In particular, all of the individual features and possible refinements of the invention and its exemplary embodiments can be combined.

I claim:

1. An airbag device, comprising:
   a multipart dashboard including a dashboard upper part and a dashboard lower part, said dashboard upper part and said dashboard lower part being configured as separate parts when said multipart dashboard is in a closed state, at least one of said dashboard upper part and said dashboard lower part being a deformable dashboard part;
   an airbag module disposed behind said multipart dashboard; and
   an opening device operatively connected to said multipart dashboard, said opening device being configured to deform said deformable dashboard part such that said multipart dashboard opens.

2. The airbag device according to claim 1, wherein said opening device includes a piston configured to be acted upon and adjusted for opening at least one of said dashboard upper part and said dashboard lower part.

3. The airbag device according to claim 2, wherein:
said airbag module is a substantially cylindrical airbag module; and
said piston is guided on said substantially cylindrical airbag module.

4. The airbag device according to claim 3, wherein said piston is guided on said substantially cylindrical airbag module such that said piston performs a helicoidal linear and rotational movement.

5. The airbag device according to claim 2, wherein:
said opening device includes at least one mechanism selected from the group consisting of a pulling mechanism and a lever mechanism; and
said piston is connected to at least one of said dashboard upper part and said dashboard lower part via said at least one mechanism.

6. The airbag device according to claim 5, wherein said pulling mechanism includes a cable.

7. The airbag device according to claim 1, wherein said opening device is configured to adjust at least one of said dashboard upper part and said dashboard lower part in order to form an airbag emergence opening.

8. The airbag device according to claim 1, wherein said opening device is configured to open said multipart dashboard at a point in time selected from the group consisting of a time prior to a triggering of said airbag module, during the triggering of said airbag module, and after the triggering of said airbag module.

9. A method for operating an airbag device, the method which comprises:
providing an airbag module behind a multipart dashboard having a dashboard upper part and a dashboard lower part, the dashboard upper part and the dashboard lower part being configured as separate parts when the multipart dashboard is in a closed state, at least one of the dashboard upper part and the dashboard lower part being a deformable dashboard part;
triggering the airbag module; and
opening the multipart dashboard by deforming the deformable dashboard part such that the multipart dashboard opens at a point in time selected from the group consisting of a time prior to the triggering the airbag module, during the triggering of the airbag module, and after the triggering of the airbag module.

10. The method according to claim 9, which comprises adjusting at least one of the dashboard upper part and the dashboard lower part of the multipart dashboard for providing an airbag emergence opening.

11. The method according to claim 9, which comprises deforming at least one of the dashboard upper part and the dashboard lower part of the multipart dashboard for providing an airbag emergence opening.

12. The method according to claim 9, which comprises using a piston for opening the multipart dashboard.

13. The method according to claim 12, which comprises using a gas generator of the airbag module for operating the piston.

14. The method according to claim 12, which comprises using a gas generator of the airbag module for operating the piston and using the gas generator for producing gas for filling an airbag.

15. The method according to claim 14, which comprises controlling, with a position of the piston, the filling of the airbag with gas from the gas generator of the airbag module.

16. The method according to claim 12, which comprises:
connecting the piston to the multipart dashboard via a pulling device; and
opening the multipart dashboard by performing a helicoidal linear and rotational movement with the piston.

17. The method according to claim 16, which comprises using a cable as the pulling device.

* * * * *